United States Patent
Hebron

(10) Patent No.: US 8,861,357 B2
(45) Date of Patent: Oct. 14, 2014

(54) METHOD AND APPARATUS FOR COMMUNICATING UNICAST PQOS DFID INFORMATION

(75) Inventor: Yoav Hebron, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 524 days.

(21) Appl. No.: 12/955,642

(22) Filed: Nov. 29, 2010

(65) Prior Publication Data

US 2011/0128852 A1 Jun. 2, 2011

Related U.S. Application Data

(60) Provisional application No. 61/265,178, filed on Nov. 30, 2009.

(51) Int. Cl.
*H04L 12/28* (2006.01)
*H04L 12/911* (2013.01)

(52) U.S. Cl.
CPC .......... *H04L 12/2801* (2013.01); *H04L 47/781* (2013.01)
USPC ........................................................ 370/235

(58) Field of Classification Search
USPC ............ 370/390, 392, 389, 394, 395.21, 474, 370/393, 328, 229, 230.1, 235, 238, 351, 370/356, 395.1, 396, 400, 431
See application file for complete search history.

(56) References Cited

U.S. PATENT DOCUMENTS

| | | | | |
|---|---|---|---|---|
| 8,094,658 B2* | 1/2012 | Pfeffer et al. | ................. | 370/392 |
| 2002/0059432 A1* | 5/2002 | Masuda et al. | ................. | 709/227 |
| 2002/0087755 A1* | 7/2002 | Lueker et al. | ................. | 710/52 |
| 2004/0125797 A1* | 7/2004 | Raisanen | ................. | 370/389 |
| 2005/0232193 A1 | 10/2005 | Jorgensen | | |
| 2006/0007854 A1 | 1/2006 | Yu | | |
| 2007/0025350 A1* | 2/2007 | Kyung et al. | ................. | 370/390 |
| 2008/0192752 A1* | 8/2008 | Hyslop et al. | ................. | 370/395.21 |
| 2008/0212591 A1 | 9/2008 | Wu et al. | | |
| 2008/0219176 A1 | 9/2008 | Yamada | | |
| 2008/0298241 A1* | 12/2008 | Ohana et al. | ................. | 370/235 |
| 2009/0067372 A1* | 3/2009 | Shah et al. | ................. | 370/328 |
| 2010/0031297 A1* | 2/2010 | Klein et al. | ................. | 725/78 |
| 2010/0097931 A1* | 4/2010 | Mustafa | ................. | 370/235 |
| 2010/0238932 A1* | 9/2010 | Kliger et al. | ................. | 370/392 |

* cited by examiner

*Primary Examiner* — Hassan Kizou
*Assistant Examiner* — Gustavo Lopez-Vargas
(74) *Attorney, Agent, or Firm* — Richard Bachand; Sheppard Mullin Richter & Hampton LLP

(57) ABSTRACT

Methods and apparatus for communicating unicast PQoS DFID information in a MoCA network are disclosed. In a transmitting apparatus, values are assigned in a first set of fields of a reservation request element, the first set adapted to indicate a unicast PQoS flow with a DFID value. Values are assigned in a second set of fields of the reservation request element, the second set adapted to represent the DFID value. A message comprising the reservation request element is transmitted to a network coordinator. In a receiving network coordinator, a message comprising a reservation request element is received, the reservation request element comprising a first set of fields and a second set of fields. It is determined whether the first set is indicative of a unicast PQoS flow with a DFID value. The DFID value is determined from the second set if the first set is indicative of a unicast PQoS flow with a DFID value.

19 Claims, 5 Drawing Sheets

METHOD AND APPARATUS FOR COMMUNICATING UNICAST PQOS DFID INFORMATION

CROSS-REFERENCE TO RELATED APPLICATIONS

This application claims priority under 35 U.S.C. §119(e) from Provisional Application Ser. No. 61/265,178, filed Nov. 30, 2009, the entirety of which is hereby incorporated by reference herein.

TECHNICAL FIELD

The presently disclosed method and apparatus relates generally to communication networks, and more particularly, some embodiments relate to communicating unicast PQoS DFID information.

DESCRIPTION OF THE RELATED ART

A home network may include several types of devices that deliver subscriber services throughout a home. These subscriber services include delivering multimedia content, such as streaming audio and video, to devices located throughout the home. As the number of available subscriber services has increased and they become more popular, the number of devices being connected within each home network has also increased. The increase in the number of services and devices increases the complexity of coordinating communication between the network nodes. This increase also generally tends to increase the amount of traffic carried on the network.

The network of FIG. 1 is one example of a Multimedia over Coax Alliance (MoCA) network implemented in a home. In this example, a wired communications medium 100 is shown. The wired communications medium 100 might be a coaxial cable system, a power line system, a fiber optic cable system, an Ethernet cable system, or other similar communications medium. Alternatively, the communications medium 100 might be a wireless transmission system. In the embodiment of FIG. 1, the communications medium 100 is coaxial cabling deployed within a residence 101.

The network of FIG. 1 comprises a plurality of network nodes 102, 103, 104, 105, 106 in communication with one another according to a communications protocol. In one such example, the communications protocol conforms to a networking standard, such as the well known MoCA standard. Accordingly, the communications protocol defines a packet based communications system.

In some cases, activity on the network is controlled by a Network Coordinator (NC). In such networks, the communications medium is shared by all of the nodes in the network. The NC manages access to the shared communications medium and manages the "quality-of-service" of transmissions on the network. In one such case, one of the nodes is selected to perform the functions of the NC based upon a process defined by the communications protocol.

In networks employing an NC, the NC schedules network communications between network nodes using a Media Access Plan (MAP). The MAP is sent as a packet. Such MAP packets are sent on a regular basis. MAPs schedule all of the traffic to be sent over the MoCA channel on which the network is operating. That includes scheduling the times during which nodes can transmit. Transmit times for data packets are scheduled by the NC in response to reservation requests (RRs) by the nodes of the network.

With continued reference to FIG. 1, a node 102 serves as a network communications module (e.g., a MoCA node) and is coupled to one of the computers 109. The node 102 allow the computer 109 to communicate on the communications medium 100 in accordance with the communications protocol used on the medium 100. The node 106 is associated with a television 111 to allow the television 111 to receive and display media streamed from one or more other network nodes 102, 104, 105. Alternatively, a node might be associated with (i.e., coupled to or integrated into) a speaker or other music or video device. A node might also be associated with a module that interfaces with an Internet or cable service provider 112, for example to provide Internet access, digital video recording capabilities, media streaming functions, or network management services to the residence 101.

A transmitting node 102 can set up as many flows as needed to communicate with the other nodes of the network. For the purposes of this disclosure, a "flow" is a communication of information organized as a stream of packets transmitted between a transmitting node and at least one receiving node. A flow will typically include a set of related information to be communicated from the transmitting node to the receiving node. The information may be a digital stream of data representing the entire content of a movie to be displayed on a television or other video monitor. The entire stream of data used to stream the movie may be associated with one flow.

Some home networks specify quality of service (QoS) parameters to ensure that an appropriate priority is assigned for particular flows of data. QoS parameters can also be used to ensure that sufficient resources are allocated to the communication of user content without undesirable interruptions or delays. For example, a user that is playing a video game will only have a desirable experience if the commands that he provides are communicated to the game console in a manner that ensures a rapid reaction to the commands on the monitor or television. Delays in implementing gaming commands can significantly impair the quality of the experience. Accordingly, the use of QoS parameters and protocols can help ensure a satisfactory user experience while ensuring that resources are not unnecessarily expended on communicating information more rapidly than is necessary if the content has a high tolerance for latency (i.e., delay).

In a home network, QoS can be classified into two main categories: Parameterized QoS (PQoS) and Prioritized QoS. PQoS provides a quantified measure of quality which is defined by a "Traffic Specification" (TSPEC) for each flow. The TSPEC of a PQoS flow defines the requirements and parameters of the flow. The TSPEC of a PQoS flow typically includes information like Peak Rate, Maximum Packet Size, etc. For example, in a MoCA network in which PQoS is implemented, the Peak Rate parameter indicates the maximum amount of data (in bytes) that will need to be transmitted in a very short time interval (like a MAP cycle). Each Parameterized QoS flow must first go through a formal PQoS flow admission process before the flow is allowed to start any data packet transmission.

The PQoS flow admission process allows all the nodes involved in the flow to reserve appropriate node level resources (like buffers) and network level resources (like network transmission time and timeliness of such transmissions), in order to guarantee that the parameters associated with the TSPEC can be met. Once a PQoS flow is "admitted," the resources necessary to transmit the entire flow from the transmitting node to one or more receiving nodes are guaranteed. If a PQoS flow is rejected after the PQoS flow admission process, the PQoS flow cannot be started.

On the other hand, for Prioritized QoS, there is no admission process. Each Prioritized QoS flow is assigned a priority by the node sending the flow. Assigning a priority merely places the flow in a priority group. Those flows that are in the group having the highest priority will be allowed to transmit before flows that are in group having a relatively lower priority. However, unlike PQoS flows, prioritized QoS flows are not guaranteed to get the resources necessary to ensure that packets of the flows are transmitted timely.

Only PQoS flows must go through the PQoS flow admission process to ensure that sufficient network bandwidth and node level resources are reserved for them. The PQoS flow admission process ensures that that the resources required by the PQoS flows will be available when needed during the actual data packet transmission phase. The data packet transmission phase of a PQoS flow is the phase during which the transmitting node actually makes RRs for individual data packets or groups of data packets of the flow. In addition, during the data packet transmission phase an RR is "granted" (i.e., time is scheduled during which the packets will be transmitted) or the RR is discarded by the NC. Whether the RR is granted or discarded depends on the availability of network bandwidth for this request. It should be noted that for the purpose of this description, "grants the request" means that the NC assigns a transmission slot to the packet associated with the RR to allow the node that generated the request to transmit the associated packet during the assigned transmission slot in the next MAP cycle. The NC then transmits a MAP to indicate the schedule to all of the nodes of the network, including the requesting node. Each requesting node then transmits the packets according to the schedule indicated by the MAP. Further details regarding MAPs and RRs are provided below.

The data packet transmission phase of a PQoS flow can start only after the PQoS flow admission phase is successful. Since resources are not guaranteed to other (i.e., Prioritized) QoS flows, a node can always down-grade a rejected PQoS flow to a Prioritized QoS flow, and start transmitting the flow with Prioritized QoS level.

The MoCA network is temporally divided into cycles referred to as MAP cycles. The MAP cycles are divided into time slots. During each MAP cycle, the NC transmits a MAP packet that indicates which nodes will transmit during each time slot of the next MAP cycle (including which slot in the next MAP cycle will contain the next MAP packet). Accordingly, a given MAP cycle includes the communication activity on the channel under the control of the previously sent MAP. That is, each MAP schedules all of the communication activity for the next MAP cycle.

FIG. 2 is a timing diagram that illustrates the timing relationship between MAPs 201, 202 and MAP cycles 203, 205. The MAP cycle 205 is defined as the communication activity on the channel under the control of the previously sent MAP 201. Accordingly, each MAP 201 schedules all of the communication activity for the next MAP cycle 205. Only one such "next MAP cycle" 205 is shown in FIG. 2, however, it will be understood that MAP 202 schedules all communications for the MAP cycle that follows MAP cycle 205 (not shown). It should be noted that the next MAP 202 is sent during the next MAP cycle 205 under the scheduling control of the previous MAP 201. Accordingly, MAP 201 determines the following information for each packet to be sent in the next MAP cycle 205: i) packet start time; ii) packet duration; iii) source node; and iv) destination node(s). Similarly, MAP 202 determines this information for the MAP cycle that follows (not shown). The combination of a packet start time, the packet duration for the packet to be sent at that start time, and the source node and destination node(s) for that packet are referred to herein as a "transmission slot assignment." It should be noted that as provided herein, packet length is the number of bytes in a packet and packet duration is the amount of time required to transmit that number of bytes.

One particular type of packet that the MAP 201, 202 is responsible for scheduling is reservation requests (RR) 207, 209, 211. Three such RRs are shown in the first MAP cycle 203 of FIG. 2, starting with the first RR 207 and ending with the last RR 209. One RR 211 is shown in the second MAP cycle 205. Each RR 207, 209 is sent from one node. Each RR 207, 209 may contain one or more Reservation Request Elements (RREs). Each RRE communicates information regarding a desire on the part of the node from which the RR 207, 209 was sent to transmit one MoCA packet containing one or more Ethernet packets. A MoCA packet can contain more than one Ethernet packet through a process called Aggregation. In accordance with MoCA 2.0, RRs from different nodes are sent simultaneously on each of the several OFDM sub-channels without significant increase in overhead. Accordingly, one RR can be sent for each node every MAP cycle.

Table 1 below shows the reservation request element (RRE) format in MoCA 2.0.

TABLE 1

Reservation Request Element Format in MoCA 2.0

| Field | Length | Usage |
| --- | --- | --- |
| FRAME_SUBTYPE | 4 bits | If FRAME_TYPE = Link Control (0x2)<br>0x0 - Type I/III Probe Report<br>0x1 - Reserved Type II<br>0x2 - Reserved Type II<br>0x3 - Key distribution<br>0x4 - Dynamic Key distribution<br>0x5 - Type I/III Probe Report Request<br>0x6 - Link Acknowledgement<br>0x7 - Reserved Type II<br>0x8 - Periodic Link Packet<br>0x9 - Power Control<br>0xA - Power Control Response<br>0xB - Power Control Acknowledgement<br>0xC - Power Control Update<br>0xD - Topology update<br>0xE - Unicast MAC Address Notification<br>0xF - Reserved Type II<br>If FRAME_TYPE = Ethernet Transmission<br>0x0 = ETHERNET_PACKET for aggregated packet data unit (A-PDU)<br>0x1 = Opportunistic reservation request for A-PDU<br>If FRAME_TYPE = Link Control II (0x9)<br>0x3 - Receiver-Determined Probe Request |
| FRAME_TYPE | 4 bits | 0x2 = Link Control<br>0x3 = Ethernet Transmission<br>0x9 = Link Control II |
| DESTINATION | 8 bits | Node ID of the destination node |
| PHY_PROFILE | 8 bits | Indicates the type of modulation scheme used for this transmission<br>bits 7:6<br>00 = profile sequence 0<br>01 = profile sequence 1<br>bits 5:0<br>0x02 = Diversity Mode profile<br>0x07 = Unicast profile<br>0x08 = Broadcast profile<br>0x0D = Unicast profile in MoCA 2.0 PHY<br>0x0E = Broadcast (BBL) profile in MoCA 2.0 PHY<br>0x10 = VLPER Unicast profile in MoCA 2.0 PHY. |

TABLE 1-continued

Reservation Request Element Format in MoCA 2.0

| Field | Length | Usage |
|---|---|---|
| | | 0x11 = VLPER Broadcast profile in MoCA 2.0 PHY.<br>0x12 = Unicast profile in channel bonding<br>0x14 = VLPER Unicast profile in channel bonding<br>0x15 = Diversity Mode profile in MoCA 2.0 100 MHz channel<br>0x16 = Diversity Mode profile in secondary channel of a bonded link<br>All other values reserved.<br>Bits 5:0 SHOULD be ignored if FRAME_TYPE = Control II (0x9) and FRAME_SUBTYPE = 0x3. |
| REQUEST_ID | 8 bits | A sequence number associated with the request. |
| PARAMETERS | 11 bits | If FRAME_TYPE = Ethernet Transmission and FRAME_SUBTYPE = 0x0<br>Bit 11 reserved<br>Bits 10:0 -<br>Total data size of the FEC padding bytes in the last symbol. Combined with the DURATION field, this field is used to calculate the total Media Access Control Packet Data Unit (MPDU) size which cannot exceed $S_a$ by NC.<br>If FRAME_TYPE = Ethernet Transmission and FRAME_SUBTYPE = 0x1 and PRIORITY = 0x3<br>Bits 11:7 - Reserved<br>Bit 6 - Maximum aggregation flag<br>0: the A-PDU has NOT reached either maximum aggregation size or maximum aggregation packet number<br>1: the A-PDU has reached either maximum aggregation size or maximum aggregation packet number<br>Bits 5:0 - The smallest Time to Live (TTL) value of PQoS packets in the A-PDU<br>Else<br>Bits 11:0 -- Reserved. |
| PRIORITY | 4 bits | If FRAME_TYPE = Control<br>0x0<br>If FRAME_TYPE = Ethernet Transmission:<br>0x0 - Low Priority<br>0x1 - Medium Priority<br>0x2 - High Priority<br>0x3 - PQoS Priority<br>0x4 - Background Priority |
| DURATION | 16 bits | Transmission time required in multiples of SLOT_TIMEs |

As can be seen from Table 1, the MoCA 2.0 RRE format contains the following fields: FRAME_SUBTYPE field, FRAME_TYPE field, DESTINATION field, PHY_PROFILE field, REQUEST_ID field, PARAMETERS field, PRIORITY field, and DURATION field.

The RR 207, 209 and associated RREs allow a client node to communicate to the NC that the client node has data packets it wishes to send. Furthermore, the RRE indicates the associated destination node(s), packet duration, and priority for those data packets. The NC uses this information to schedule "transmission slots" during which the client node can transmit those data packets it wishes to send. The NC then communicates that schedule by generating and transmitting the MAP 201 having transmission slot assignments for the next MAP cycle 205. A non-PQoS (i.e. Prioritized QoS) RRE is used for a non-PQoS flow, while a PQoS (i.e. Parameterized QoS) RRE is used for a PQoS flow. Any RRE that the NC cannot schedule in the next MAP cycle 205 is discarded and must be retransmitted by the node from which they originated.

Each PQoS flow is identified by a unique Destination Flow Identification (DFID). Packets that belong to a particular PQoS flow are logically bound together by the DFID. Multicast flows, like PQoS flows, are identified by a DFID. Unicast flows that are not PQoS flows are identified by the destination Node ID of the node to which the flow is to be transmitted. Broadcast flows are identified by a broadcast ID that is assigned to 0x3F (the hexidecimal value "3F"). It is desirable to associate a reservation request (e.g., RR 207, 209, 211) for unicast PQoS flows with a particular DFID value. However, as can be seen from the existing MoCA 2.0 RRE format shown in Table 1, currently there is no field available to represent the DFID value.

Because there is currently no way to communicate the unique DFIDs in the existing RRE structure, the ability of the NC to perform some of the functions that might otherwise be available is limited. While it is possible to define and add one or more additional special fields to the existing MoCA 2.0 RRE format to carry this information, the addition of such special fields would result in additional overhead and as a result will have a negative impact on the network performance. The impact is aggravated by the fact that any expansion of the existing RRE format must occur in multiples of 4 bytes (32 bits). Therefore, given that the existing MoCA 2.0 RRE format uses 8 bytes (64 bits), the addition of one or more special fields for carrying the DFID value will result in 50% increase in overhead needed to transmit the RRE even though only a fraction of the expanded 32 bits is necessary for carrying the DFID value. As a result of the increase in the overhead, the network's data transmission efficiency will be reduced.

Since the existing RRE format does not allow for communication of unique DFIDs, the NC is limited in its ability to perform some of the desired functions that might otherwise be available. Accordingly, there is a need for a method and apparatus for communicating unicast PQoS DFID information without increasing the size of the existing RR frame format.

SUMMARY

Certain embodiments of the presently disclosed method and apparatus provide a means for transmitting PQoS DFID information in a MoCA network. In one embodiment of the disclosed apparatus, a processor assigns one or more values in a first set of one or more fields of a reservation request element. The value assigned to the first set of fields indicates that a unicast PQoS flow having a DFID value is being requested. The processor can also assign one or more values to a second set of one or more fields of the reservation request element to represent the DFID value. The processor causes a message having the reservation request element to be transmitted to a network coordinator.

Some embodiments have a network controller within a MoCA network. The network controller receives unicast PQoS DFID information. The network controller includes a processor. The processor receives a message having a reservation request element from a node in the MoCA network. The reservation request element has a first set of one or more fields and a second set of one or more fields. The processor determines from the first set of one or more fields whether a unicast PQoS flow with a DFID value is requested by the node. The processor can also determine the DFID value from the second set of one or more fields if the first set of one or more fields indicates that a unicast PQoS flow with a DFID value is requested.

In some of the embodiments disclosed herein, a method is disclosed for transmitting PQoS DFID information in a MoCA network. The method comprises assigning one or more values to a first set of one or more fields of a reservation request element. The first set of fields indicates that a unicast PQoS flow associated with a DFID value is requested by the node transmitting the reservation request element. One or more values in a second set of one or more fields of the reservation request element are assigned to represent the DFID value associated with the PQoS flow. A message comprising the reservation request element is then transmitted to a network coordinator.

A method is also disclosed for receiving PQoS DFID information in a MoCA network. The method comprises receiving from a node, a message having a reservation request element. The reservation request element includes a first set of one or more fields and a second set of one or more fields. The first set of one or more fields indicates that a unicast PQoS flow with a DFID value is requested. The method further comprises determining the DFID value from the second set of one or more fields if the first set of one or more fields indicates that a unicast PQoS flow with a DFID value is requested.

In accordance with one embodiment of the disclosed method and apparatus, a node within a MoCA network assigns one or more values in a first set of one or more fields of a reservation request element. The first set of fields indicate that a unicast PQoS flow with a DFID value is requested. The node further comprises a means for assigning one or more values in a second set of one or more fields of the reservation request element. The second set of fields represent the DFID value. The node transmits a message comprising the reservation request element to a network coordinator.

In certain embodiments, a network controller in a MoCA network is provided. The network controller receives a message having a reservation request element from a node. The reservation request element has a first set of one or more fields and a second set of one or more fields. The network controller determines whether the first set of one or more fields indicates that a unicast PQoS flow with a DFID value is requested. The network controller determines the DFID value from the second set of one or more fields if the first set of one or more fields indicates that a unicast PQoS flow with a DFID value is requested.

In certain embodiments, a computer readable medium comprising computer executable instructions is provided. The execution of the instructions causes a processor in an apparatus in a MoCA network to assign one or more values to a first set of one or more fields of a reservation request element. The first set of fields indicates that a PQoS flow associated with a DFID value is requested. A value is assigned to a second set of one or more fields of the reservation request element. The second set of fields represent the DFID value associated with the requested flow. The processor than causes a message comprising the reservation request element to be transmitted to a network coordinator.

In one embodiment, a computer readable medium comprising computer executable instructions causes a processor in a network coordinator in a MoCA network to: (1) receive a message comprising a reservation request element from a node in the network; (2) determine whether a first set of one or more fields in the reservation request element indicate that a unicast PQoS flow with a DFID value is requested; and (3) determine the DFID value from a second set of one or more fields if the first set of one or more fields indicate that a unicast PQoS flow with a DFID value is requested.

Other features and aspects of the disclosed method and apparatus will become apparent from the following detailed description, taken in conjunction with the accompanying drawings, which illustrate, by way of example, the features in accordance with embodiments of the disclosed method and apparatus.

The summary is not intended to limit the scope of the claimed invention, which is defined solely by the claims attached hereto.

BRIEF DESCRIPTION OF THE DRAWINGS

The disclosed methods and apparatus are described in detail with reference to the following Figures. The drawings are provided for purposes of illustration only. Accordingly, these drawings shall not be considered limiting of the breadth, scope, or applicability of the claimed invention. Note that for clarity and ease of illustration, these drawings are not necessarily made to scale.

Figure 1:
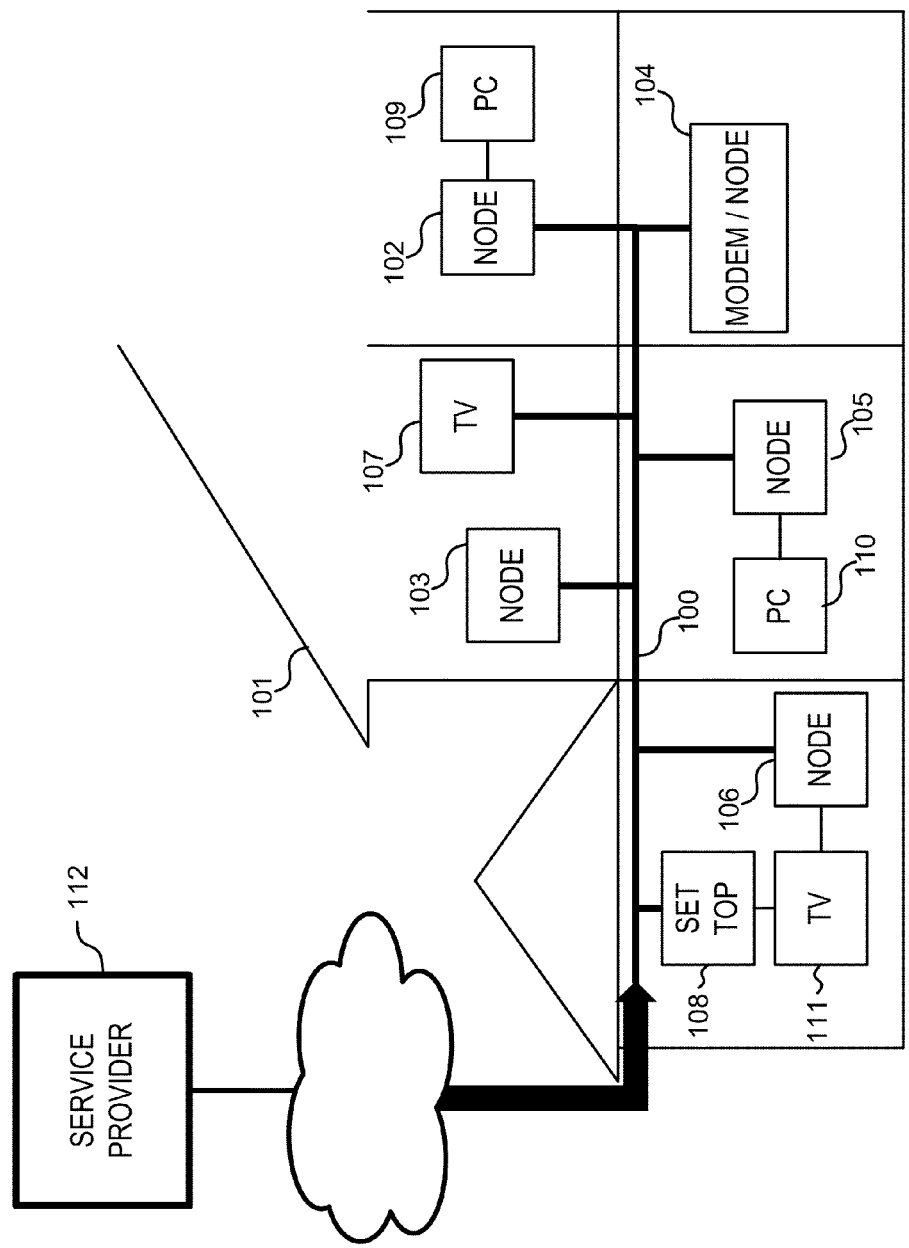
FIG. 1 illustrates an example of one environment in which some embodiments of the disclosed method and apparatus may be implemented.
Figure 2:
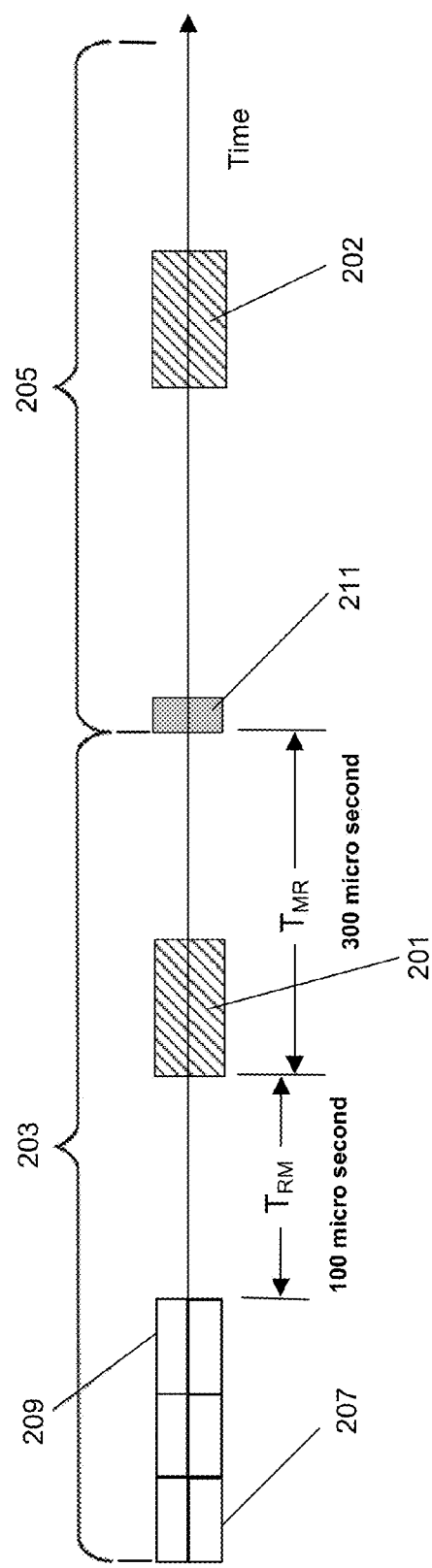
FIG. 2 is a timing diagram that illustrates the timing relationship between MAPs and MAP cycles according to certain embodiments of the methods and apparatus described herein.

The Figures are not intended to be exhaustive or to limit the claimed invention to the precise form disclosed. It should be understood that the disclosed method and apparatus can be practiced with modification and alteration, and that the claimed invention should be limited only by the claims appended hereto.

DETAILED DESCRIPTION

Various embodiments of the disclosed method and apparatus allow communication of Destination Flow Identifications (DFIDs) associated with unicast Parameterized Quality of Service (PQoS) flows without causing additional extra overhead for reservation request (RR) transmissions during a Media Access Plan (MAP) cycle. In certain aspects, the disclosed method and apparatus enable communication of unicast PQoS DFID information without expanding the size of the existing Reservation Request Element (RRE) format.

Table 2 below provides an RRE format that allows communication of DFID information associated with a unicast PQoS flow to a Network Coordinator (NC) while maintaining the size of the existing RRE frame. It should be noted that the indication "0XA" indicates a hexadecimal "A", which is the hexadecimal equivalent of decimal "10".

TABLE 2

MoCA Reservation Request Element Format in accordance with the presently disclosed method and apparatus

| Field | Length | Usage |
|---|---|---|
| FRAME_SUBTYPE | 4 bits | If FRAME_TYPE = Link Control (0x2)<br>0x0 - Type I/III Probe Report<br>0x1 - Reserved Type II<br>0x2 - Reserved Type II<br>0x3 - Key distribution<br>0x4 - Dynamic Key distribution<br>0x5 - Type I/III Probe Report Request<br>0x6 - Link Acknowledgement<br>0x7 - Reserved Type II<br>0x8 - Periodic Link Packet<br>0x9 - Power Control<br>0xA - Power Control Response<br>0xB - Power Control Acknowledgement<br>0xC - Power Control Update<br>0xD - Topology update<br>0xE - Unicast MAC Address Notification<br>0xF - Reserved Type II<br>If FRAME_TYPE = Ethernet Transmission<br>0x0 = ETHERNET_PACKET for A-PDU not belonging to a unicast PQoS Flow with a usable DFID<br>0x1 = Opportunistic reservation request for A-PDU not belonging to a unicast PQoS Flow with a usable DFID<br>0x2 = ETHERNET_PACKET for A-PDU belonging to a unicast PQoS Flow with a usable DFID<br>0x3 = Opportunistic reservation request for A-PDU belonging to a unicast PQoS Flow with a usable DFID<br>If FRAME_TYPE = Link Control II (0x9)<br>0x3 - Receiver-Determined Probe Request |
| FRAME_TYPE | 4 bits | 0x2 = Link Control<br>0x3 = Ethernet Transmission<br>0x9 = Link Control II |
| DESTINATION | 8 bits | Node ID of the destination node |
| PHY_PROFILE | 8 bits | Indicates the type of modulation scheme used for this transmission<br>bits 7:6<br>00 = profile sequence 0<br>01 = profile sequence 1<br>bits 5:0<br>0x02 = Diversity Mode profile<br>0x07 = Unicast profile<br>0x08 = Broadcast profile<br>0x0D = Unicast profile in MoCA 2.0 PHY<br>0x0E = Broadcast (BBL) profile in MoCA 2.0 PHY<br>0x10 = VLPER Unicast profile in MoCA 2.0 PHY.<br>0x11 = VLPER Broadcast profile in MoCA 2.0 PHY.<br>0x12 = Unicast profile in channel bonding<br>0x14 = VLPER Unicast profile in channel bonding<br>0x15 = Diversity Mode profile in MoCA 2.0 100 MHz channel<br>0x16 = Diversity Mode profile in secondary channel of a bonded link<br>All other values reserved.<br>Bits 5:0 SHOULD be ignored if FRAME_TYPE = Control II (0x9) and FRAME_SUBTYPE = 0x3. |
| REQUEST_ID | 8 bits | A sequence number associated with the request. |
| PARAMETERS | 11 bits | If FRAME_TYPE = Ethernet Transmission and FRAME_SUBTYPE = 0x0<br>Bits 10:0 -<br>Total data size of the FEC padding bytes in the last symbol. Combined with the DURATION field, this field is used to calculate the total MPDU size which cannot exceed $S_a$ by NC.<br>If FRAME_TYPE =Ethernet Transmission and FRAME_SUBTYPE = 0x1 and PRIORITY = 0x3<br>Bits 10:7 - Reserved<br>Bit 6 - Maximum aggregation flag<br>0: the A-PDU has NOT reached either maximum aggregation size or maximum aggregation packet number<br>1: the A-PDU has reached either maximum aggregation size or maximum aggregation packet number<br>Bits 5:0 - The smallest Time to Live (TTL) value of PQoS packets in the A-PDU<br>Else<br>Bits 10:0 -- Reserved. |
| HIGH_BIT | 1 bit | If FRAME_TYPE = Ethernet Transmission and FRAME_SUBTYPE = 0x2 or 0x3:<br>High bit of DFID<br>Else<br>Reserved Type III |
| PRIORITY_DFID | 4 bits | If FRAME_TYPE = Control<br>0x0<br>If FRAME_TYPE = Ethernet Transmission and FRAME_SUBTYPE = 0x0 or 0x1:<br>0x0 - Low Priority<br>0x1 - Medium Priority<br>0x2 - High Priority<br>0x3 - PQoS Priority<br>0x4 - Background Priority<br>If FRAME_TYPE = Ethernet Transmission and FRAME_SUBTYPE = 0x2 or 0x3:<br>LS bits of DFID of the unicast PQoS Flow (DFID = 16*HIGH_BIT+PRIORITY) |
| DURATION | 16 bits | Transmission time required in multiples of SLOT_TIMEs |

Comparing the previous MoCA 2.0 RRE format of Table 1 (provided in the background above) to the RRE format of Table 2 shows that the previously defined Priority field of Table 1 has been redefined as a "Priority_DFID" field in Table 2. The values of the Priority_DFID field represent the four least significant bits (LSBs) of a DFID when the value of the FRAME_TYPE field of Table 2 is a hexidecimal "3" (representing an Ethernet transmission) and the value of the FRAME_SUBTYPE field of Table 2 is either a hexidecimal "2" or "3". As indicated by Table 2 above, a value of 0X2 in the FRAME_SUBTYPE field indicates that the packet for which the reservation is being requested is an ETHERNET_PACKET for an aggregated packet data unit (A-PDU) belonging to a unicast PQoS Flow with a usable DFID. If the value in the FRAME_SUBTYPE field is a 0X3, then the packet for which the reservation is being requested is an Opportunistic reservation request for an A-PDU belonging to a unicast PQoS Flow with a usable DFID.

Also as shown in Table 2, a "HIGH_BIT" field is defined that allows an additional bit of the DFID to be communicated in the RRE. This additional bit is the most significant bit (MSB) of the DFID. Accordingly, by taking the four LSBs in the PRIORITY_DFID field and the MSB in the HIGH_BIT field, a five bit DFID value exists that defines 32 unique values.

As shown in Table 1, the HIGH_BIT was previously designated as a reserve bit in the TOTAL_SIZE field. Therefore, use of the HIGH_BIT to represent the MSB of the DFID does not disrupt the previously defined MoCA protocol. In addition, since the DFID is only used in certain circumstances, additional bits in the FRAME_SUBTYPE field indicate when the HIGH_BIT carries the value of the MSB of a DFID. That is, if the FRAME_TYPE indicates that the frame is a frame of an Ethernet transmission by carrying the value 0x3, then the value of the FRAME_SUBTYPE indicates:

Hexidecimal 0=ETHERNET_PACKET for aggregated packet data unit (A-PDU) not belonging to a unicast PQoS Flow with a usable DFID;

Hexidecimal 1=Opportunistic reservation request for A-PDU not belonging to a unicast PQoS Flow with a usable DFID;

Hexidecimal 2=ETHERNET_PACKET for A-PDU belonging to a unicast PQoS Flow with a usable DFID; or Hexidecimal 3=Opportunistic reservation request for A-PDU belonging to a unicast PQoS Flow with a usable DFID.

The example embodiment described above allows up to 32 unique unicast PQoS Flows to be identified for each ingress (i.e., source) node.

It shall be appreciated in view of the present disclosure that the RRE format of Table 2 is provided for the purpose of illustration only and a multitude of changes, including addition, deletion and modification, can be made to the RRE format in accordance with the methods and apparatus described herein.

For example, in certain alternative embodiments, an even greater number of unique DFIDs of unicast PQoS flows per ingress node can be communicated. This can be achieved by utilizing any of the unassigned values of the FRAME_SUBTYPE field. By way of example, when FRAME_TYPE field indicates an Ethernet transmission, only two (e.g., $1^{st}$ and $2^{nd}$) bits out of four bits of the FRAME_SUBTYPE field are used to indicate one of the four possibilities described above. Therefore, the remaining two (e.g., $3^{rd}$ and $4^{th}$) bits of the FRAME_SUBTYPE can be used as higher (e.g., $6^{th}$ and $7^{th}$) bits of the DFID value.

In an alternative embodiment, a value of hexidecimal "1F" is communicated to the NC by the combination of the HIGH_BIT and the PRIORITY_DFID fields to identify or represent all unicast PQoS Flows DFIDs with values 0x1F and higher. This scheme reduces the number of DFIDs that are uniquely reported to the NC from 32 to 31, but allows the support of unlimited unicast PQoS flows per ingress node (even though only 31 of them will be uniquely identified in the RR).

In some other alternative embodiments, the FRAME_SUBTYPE values 0x4 and 0x5 (or any other unused pair of values) are used to indicate that the combination of the HIGH_BIT field and the PRIORITY_DFID field represents DFID values from 32 to 63, thus doubling the number of supported unicast PQoS DFID values (and unicast PQoS Flows per ingress node) from 0 to 63. By way of example, the FRAME_SUBTYPE value of 0x4 can provide such indication for ETHERNET_PACKET for A-PDU belonging to a unicast PQoS Flow with a usable DFID, while FRAME-SUBTYPE value of 0x5 can provide such indication for Opportunistic reservation request for A-PDU belonging to a unicast PQoS Flow with a usable DFID.

Additional pairs can be used to extend the number of DFIDs even further. For example, the FRAME_SUBTYPE values 0x6 and 0x7 can be used to indicate that the combination of the HIGH_BIT field and the PRIORITY_DFID field represents all unicast PQoS DFID values from 64 to 95, and so on.

In yet other embodiments, additional one or more pairs of FRAME_SUBTYPE values are used to extend the number of DFIDs as described above, but one PRIORITY_DFID value (e.g., the highest value) is used to indicate all DFIDs beyond a predetermined value. In one embodiment, the predetermined value corresponds to the highest value for which the combination of the HIGH_BIT field and the PRIORITY_DFID field and the additional pairs of extension-indicating FRAME_SUBTYPE values can represent. By way of example, if 5 bits of the HIGH_BIT and PRIORITY_DFID fields and FRAME_SUBTYPE value of 0x4 or 0x5 are used to indicate unique DFID values from 0 to 63 as indicated above, the FRAME_SUBTYPE value 0xE and 0xF can be used to represent all unicast PQoS DFIDs with values beyond 63. In one embodiment, 0xE is used for RRs and 0xF is used for ORRs.

In some alternative embodiments, locations of least and most significant bits may be different from the respective locations in the embodiment of Table 2. By way of example, the HIGH_BIT field may be used to represent the LSB of the DFID value while the lowest ($1^{st}$) bit of the PRIORITY_DFID field may be used to represent the MSB of the DFID value. In certain embodiments, the bit pattern of the combination of the HIGH_BIT and PRIORITY_DFID fields may be reversed as compared to the embodiment described above. For example, the 5-bit combination having the binary bit pattern of "11111" may be used to represent the DFID value of 0x0 while the 5-bit combination having the binary bit pattern of "00000" may be used to represent the DFID value of 0x1F. One skilled in the art would appreciate that DFID values from 0 to 31 can be represented using the 5-bit combination in many different ways as long as the NC also knows about the particular representation scheme being used.

In some alternative embodiments, only the PRIORITY_DFID field but not the HIGH_BIT field is used to indicate the DFID value. In some alternative embodiments, only one of the FRAME_TYPE and FRAME_SUBTYPE fields, rather than both fields, is used to indicate a unicast PQoS flow with a DFID value. By way of example, a combination of 4 FRAME_TYPE values (e.g., 0x3-0x6) may be used as follows:

Hexidecimal 3=Ethernet Transmission and ETHERNET_PACKET for A-PDU not belonging to a unicast PQoS Flow with a usable DFID;

Hexidecimal 4=Ethernet Transmission and Opportunistic reservation request for A-PDU not belonging to a unicast PQoS Flow with a usable DFID;

Hexidecimal 5=Ethernet Transmission and ETHERNET_PACKET for A-PDU belonging to a unicast PQoS Flow with a usable DFID; or Hexidecimal 6=Ethernet transmission and Opportunistic reservation request for A-PDU belonging to a unicast PQoS Flow with a usable DFID.

Figure 3:
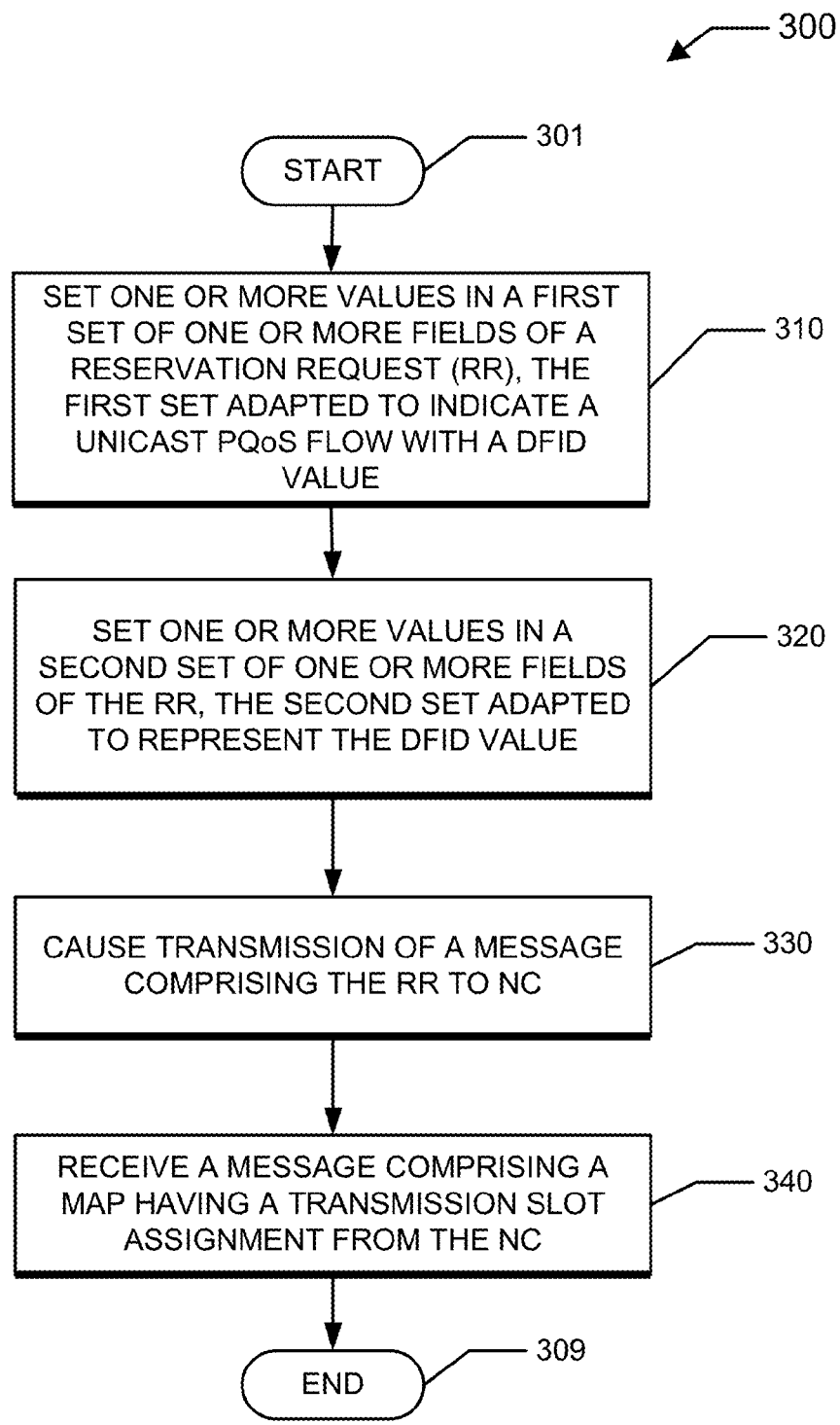
FIG. 3 is a flowchart illustrating one process for transmitting unicast PQoS DFID information according to certain embodiments of the methods and apparatus described herein.

FIG. 3 is a diagram illustrating one process 300 for transmitting unicast PQoS DFID information from a transmitting apparatus (e.g., a client node) to a receiving network coordinator (NC) according to certain embodiments of the methods and apparatus described herein. For ease of illustration only without any intent to limit the scope of the present disclosure in any way, the process 300 is described with reference to the various embodiments described above with respect to Table 2.

The process 300 begins at start state 301 and proceeds to operation 310 in which a processor of the apparatus assigns one or more values in a first set of one or more fields of a RRE. In certain embodiments, the first set of fields indicate a unicast PQoS flow with a DFID value. In the example of Table 2, the first set of fields includes a first field (FRAME_TYPE) and a second field (FRAME_SUBTYPE). In that particular example, the first set of fields indicates a unicast PQoS flow with a DFID value if the FRAME_TYPE value is assigned to a hexidecimal "3" (representing an Ethernet transmission) and the FRAME_SUBTYPE value is hexidecimal "2" or "3" (representing an ETHERNET_PACKET for A-PDU belonging to a unicast PQoS Flow with a usable DFID or an Opportunistic reservation request for A-PDU belonging to a unicast PQoS Flow with a usable DFID). As described above, in certain alternative embodiments, only one of the FRAME_TYPE and FRAME_SUBTYPE fields is used to indicate a unicast PQoS flow with a DFID value.

The process 300 proceeds to operation 320 in which a processor of the apparatus assigns one or more values in a second set of one or more fields of the RRE. The value of the second set of fields represents the DFID value. In the example of Table 2, the second set of fields includes a first field (PRIORITY_DFID) that represents the four LSBs of the DFID value and a second field (HIGH_BIT) that represents the MSB of the DFID value when the first set of fields indicates that a unicast PQoS flow with a DFID value is being requested. In the particular example of Table 2, by taking the four LSBs defined by the PRIORITY_DFID field and the MSB defined by the HIGH_BIT, 32 unique values can be communicated that indicate the DFID of a unicast PQoS flow.

As described above, in certain alternative embodiments, an even greater number of unique DFIDs of unicast PQoS flows per ingress node can be communicated by utilizing any or any pairs of the unassigned values of the FRAME_SUBTYPE field. Also as described above, in certain alternative embodiments, only the PRIORITY_DFID field may be used to represent the DFID value.

The process 300 proceeds to operation 330 in which a processor of the apparatus causes transmission of a message comprising the RR to a network controller (NC). The RR, as described above, comprises one or more fields representing a unique DFID value associated with a unicast PQoS flow.

On the other hand, if the FRAME_TYPE field is assigned (e.g., to 0x3) to indicate that the transmission is an Ethernet transmission, but the FRAME_SUBTYPE field is assigned (e.g., to 0x0 or 0x1) to indicate that the Ethernet transmission comprises an Ethernet packet for A-PDU not belonging to a unicast PQoS flow with a useable DFID or an opportunistic reservation request for A-PDU not belonging to a unicast PQoS flow with a useable DFID, the processor assigns the four bits of the PRIORITY_DFID field to represent the priority values.

The process 300 proceeds to operation 340 in which a processor of the apparatus receives a message comprising a MAP with a transmission slot assigned for the apparatus from the NC. In one particular embodiment, the MAP is composed at the NC based on the RRE and the unique DFID value determined therefrom. This assumes that the PQoS flow has been admitted at the NC. Alternatively, the DFID is not associated with the grant of a request. The process 300 terminates at END state 309.

Figure 4:
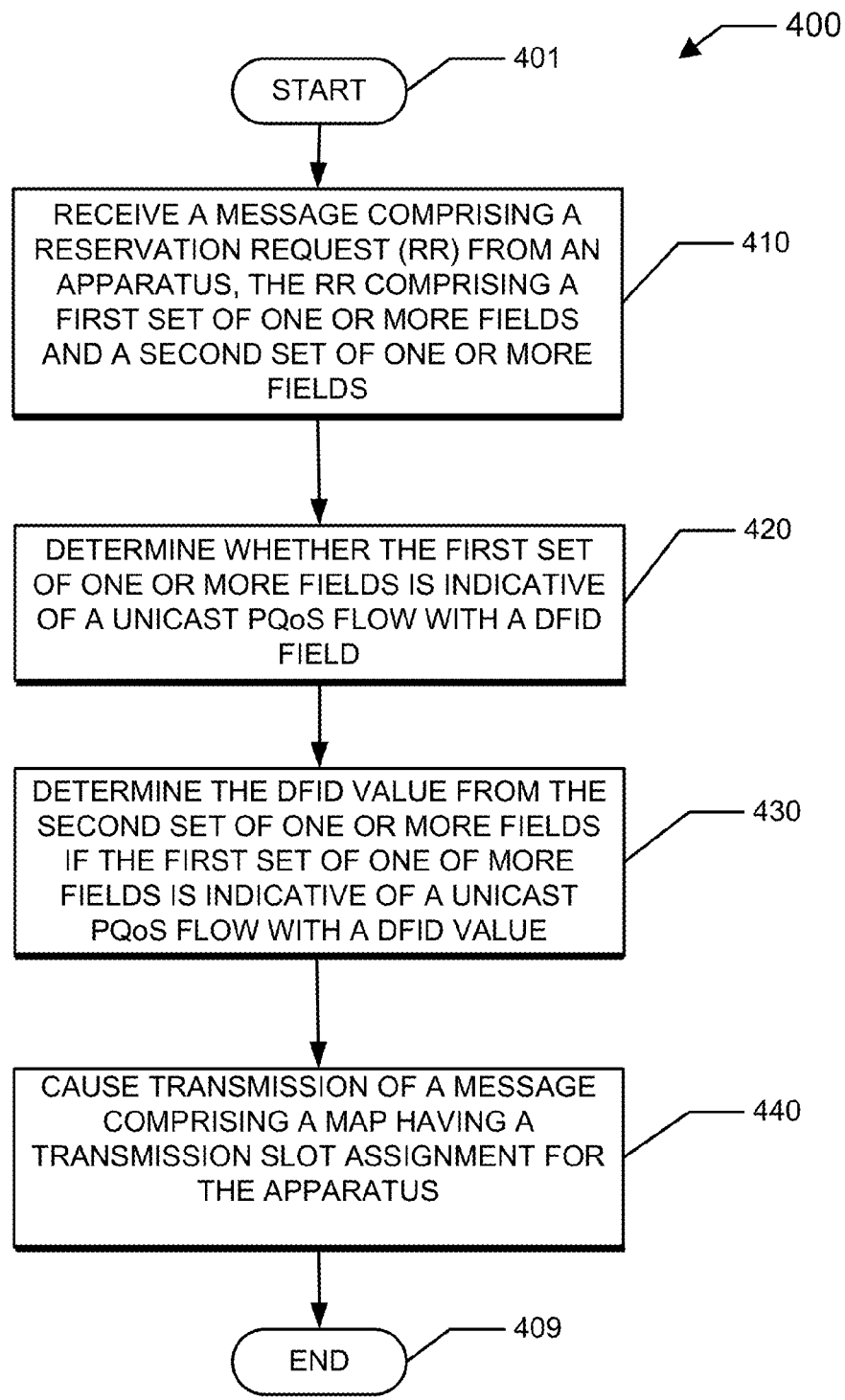
FIG. 4 is a flowchart illustrating one process for receiving unicast PQoS DFID information according to certain embodiments of the methods and apparatus described herein.

FIG. 4 is a diagram illustrating an exemplary process 400 for receiving unicast PQoS DFID information at a receiving network coordinator (NC) from a transmitting apparatus (e.g., a client node) according to certain embodiments of the methods and apparatus described herein. For ease of illustration only without any intent to limit the scope of the present disclosure in any way, the process 400 will be described with reference to the various embodiments described above with respect to Table 2.

The process 400 begins at start state 401 and proceeds to operation 410 in which the NC receives a message comprising a RRE from the apparatus. In certain embodiments, as described above, the RRE is sent to indicate that the apparatus (e.g., a client node) wishes to send a data packet to another apparatus (e.g., a destination node). The RRE comprises a first set of one or more fields and a second set of one or more fields, where the first set is adapted to indicate a unicast PQoS flow with a DFID value and the second set is adapted to represent the DFID value.

The process 400 proceeds to operation 420 in which a processor of the NC determines whether the first set of one or more fields is indicative of a unicast PQoS flow with a DFID field. In the exemplary embodiment of Table 2, the first set includes the FRAME_TYPE field and the FRAME_SUBTYPE field. In that particular example, the first set indicates a unicast PQoS flow with a DFID value if the FRAME_TYPE value is assigned to a hexidecimal "3" (representing an Ethernet transmission) and the FRAME_SUBTYPE value is hexidecimal "2" or "3" (representing an ETHERNET_PACKET for A-PDU belonging to a unicast PQoS Flow with a usable DFID or an Opportunistic reservation request for A-PDU belonging to a unicast PQoS Flow with a usable DFID).

The process 400 proceeds to operation 430 in which a processor of the NC determines the DFID value from the second set of one or more fields if the first set is indicative of a unicast PQoS flow with a DFID value. In the embodiment of Table 2, the second set includes the PRIORITY_DFID field that represents the four LSBs of the DFID value and the HIGH_BIT field that represents the MSB of the DFID value when the first set is indicative of a unicast PQoS flow with a DFID value.

However, as described above, in certain alternative embodiments, an even greater number of unique DFIDs of unicast PQoS flows per ingress node can be communicated by utilizing any or any pairs of the unassigned values of the FRAME_SUBTYPE field. In such case, the operation 430 can involve taking into account of the any one or pairs of additional FRAME_SUBTYPE values in determining the DFID value.

Furthermore, in the embodiment of Table 2, if the FRAME_TYPE field is assigned (e.g., to 0x3) to indicate that the transmission is an Ethernet transmission but the FRAME_SUBTYPE field is assigned (e.g., to 0x0 or 0x1) to indicate that the Ethernet transmission comprises an Ethernet packet for A-PDU not belonging to a unicast PQoS flow with a useable DFID or an opportunistic reservation request for A-PDU not belonging to a unicast PQoS flow with a useable DFID, the processor of the NC further determines priority values from the four bits of the PRIORITY_DFID field.

The process 400 proceeds to operation 440 in which a processor of the NC causes transmission of a message comprising a MAP having a transmission slot assigned for the apparatus. The MAP has been composed by the processor based on the RRE and the DFID value of a unicast PQoS flow determined therefrom. This also assumes that the PQoS flow has been admitted at the NC. The process 400 terminates at END state 409.

Figure 5:
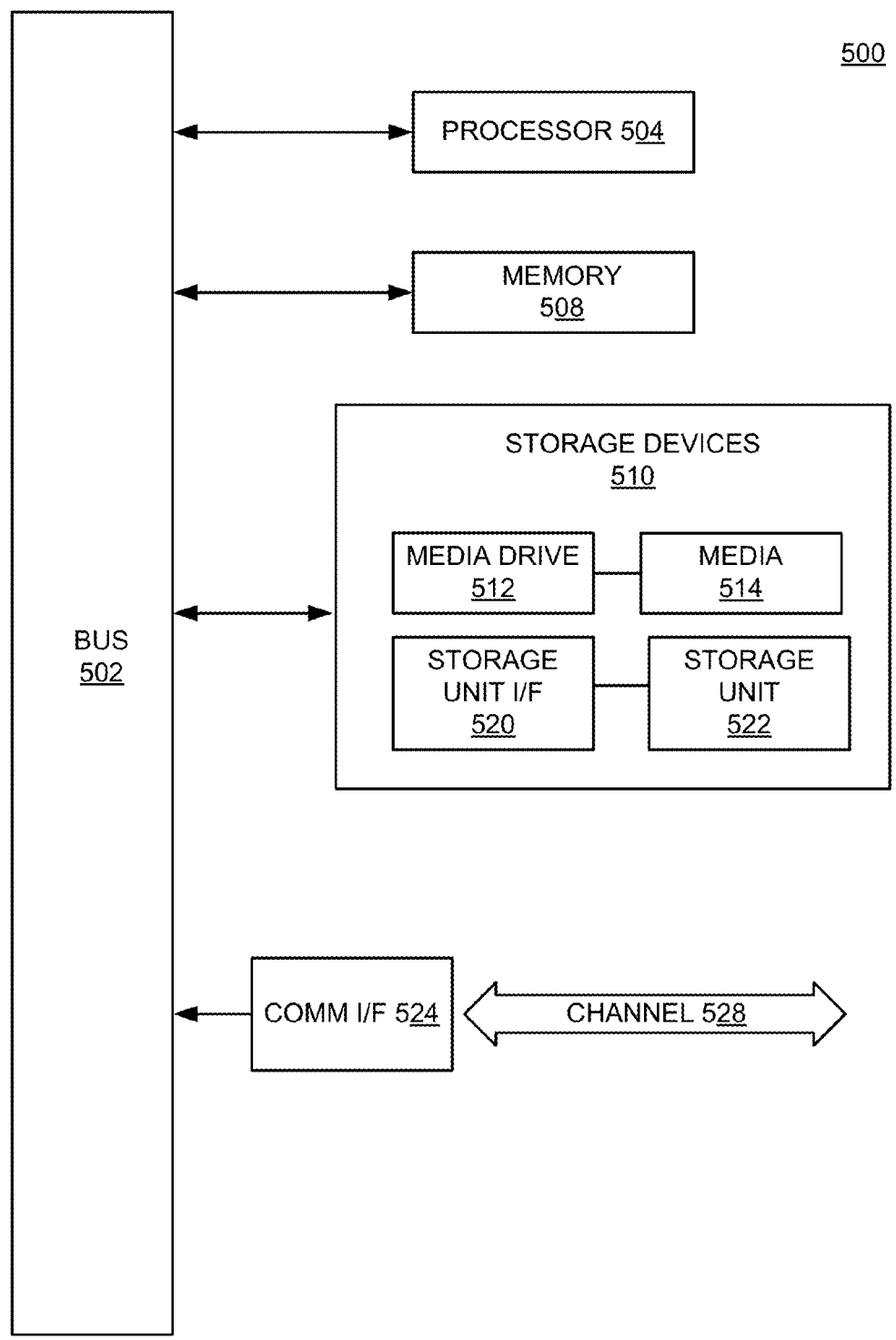
FIG. 5 is a diagram illustrating one computing module that may be used in implementing various features of embodiments of the disclosed methods and apparatus.

FIG. 5 is a diagram depicting a computing module 500 that may be used in implementing various features of embodiments of the disclosed methods and apparatus. In certain embodiments, the computing module 500 may represent computing or processing capabilities found within: desktop, laptop, notebook computers, hand-held computing devices (PDA's, smart phones, cell phones, palmtops, etc.), mainframe computers, supercomputers, workstations, servers, or any other type of special-purpose or general-purpose computing devices, as may be desirable or appropriate to perform the described functionality for a given application or environment. The computing module 500 might also represent computing capabilities embedded within or otherwise available to a given device. For example, a computing module 500 might be found in or implemented by electronic devices such as digital cameras, navigation systems, cellular telephones, portable computing devices, modems, routers, wireless access points (WAPs), terminals and other electronic devices that might include some form of processing capability.

The computing module 500 might include, for example, one or more processors, controllers, control modules, or other processing devices, such as a processor 504. The processor 504 might be implemented using a general-purpose or special-purpose processing engine such as, for example, a microprocessor, controller, or other control logic. In the illustrated example, the processor 504 is connected to a bus 502, although any communication medium can be used to facilitate interaction with other components of the computing module 500 or to communicate externally.

The computing module 500 might also include one or more memory modules, simply referred to herein as the main memory 508. In one embodiment, random access memory (RAM) or other dynamic memory might be used for storing information and instructions to be executed by the processor 504. The main memory 508 might also be used for storing temporary variables or other intermediate information during execution of instructions to be executed by the processor 504. Such instructions may perform all or some of the steps of the processes 300, 400 described above with respect to FIGS. 3 and 4. The computing module 500 might likewise include a read only memory ("ROM") or other storage device coupled to bus 502 for storing information and instructions for the processor 504.

The computing module 500 might also include one or more mechanisms for information storage 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into the computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to the computing module 500.

The computing module 500 might also include a communications interface 524. Communications interface 524 might be used to allow software and data to be transferred between the computing module 500 and external devices. Examples of communications interface 524 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

It should be clear from the broad scope of processing and storage devices disclosed, that any devices that can perform the functions disclosed would be within the scope of the disclosed method and apparatus.

In this document, the terms "computer program medium" and "computer usable medium" are used to generally refer to physical storage media such as, for example, memory 508, storage unit 520, and media 514. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all in a common package. Indeed, any or all of the various components of a module, whether control logic or other components, can be combined in a single package or separately maintained and can further be distributed in multiple groupings or packages or across multiple locations.

The invention claimed is:

1. An apparatus for transmitting PQoS DFID information in a MoCA network without increasing a size of a standard-defined MoCA reservation request frame format, the apparatus comprising a processor that:
   assigns one or more values in a first set of one or more fields of a MoCA reservation request element, the first set adapted to indicate a unicast PQoS flow with a DFID value;
   assigns one or more values in a second set of one or more fields of the MoCA reservation request, the second set adapted to represent the DFID value; and
   causes transmission of a message comprising the MoCA reservation request to a network controller.

2. The apparatus of claim 1, wherein the first set of one or more fields comprises a first field that indicates that the transmission is an Ethernet transmission, and a second field that indicates that the Ethernet transmission comprises one of:
   an Ethernet packet for A-PDU not belonging to a unicast PQoS flow with a useable DFID;
   an opportunistic reservation request for A-PDU not belonging to a unicast PQoS flow with a useable DFID;
   an Ethernet packet for A-PDU belonging to a unicast PQoS flow with a useable DFID; and
   an opportunistic MoCA reservation request for A-PDU belonging to a unicast PQoS flow with a useable DFID.

3. The apparatus of claim 2, wherein the second set of one or more fields comprises a third field previously reserved exclusively for priority values.

4. The apparatus of claim 3, wherein the third field comprises four bits that represent four bits of the DFID value.

5. The apparatus of claim 4, wherein the processor assigns the four bits to represent the priority values if the first field indicates that the transmission is an Ethernet transmission and the second field indicates that the Ethernet transmission comprises one of an Ethernet packet for A-PDU not belonging to a unicast PQoS flow with a useable DFID and an opportunistic MoCA reservation request for A-PDU not belonging to a unicast PQoS flow with a useable DFID.

6. The apparatus of claim 4, wherein the second set of one or more fields further comprises a fourth field comprising a fifth bit, wherein a combination of the four bits and the fifth bit represents the DFID value from 0 to 31.

7. The apparatus of claim 6, wherein the combination of the fourth bits and the fifth bit is assigned to a predetermined number to indicate all DFID values greater than 31.

8. The apparatus of claim 6, wherein the second field comprises two unassigned bits, wherein at least one of the two unassigned bits is used as a higher bit of the DFID value.

9. The apparatus of claim 6, wherein the second field comprises at least one pair of extension-indicating values, wherein the at least one pair of extension-indicating values is used indicate that the combination of the four bits and the fifth bit represents a DFID value higher than 31.

10. The apparatus of claim 9, wherein the second field further comprises an additional value that indicates all DFID values greater than a highest value for which the combination of the 4 bits, the fifth bits and the at least one pair of extension-indicating values can represent.

11. A network controller for receiving unicast PQoS DFID information in a MoCA network, the network controller comprising a processor that:
    receives a message comprising a MoCA reservation request element (RRE) from an apparatus;
    determines whether a FRAME_SUBTYPE field in the RRE indicates a unicast PQoS flow with a DFID value; and
    if a unicast PQoS flow with a DFID value is indicated, determines the DFID value from HIGH_BIT and FRAME_TYPE fields of the RRE.

12. The network controller of claim 11, wherein the FRAME_TYPE frame comprises four bits that represent four least significant bits of the DFID value.

13. The network controller of claim 11, wherein the HIGH_BIT Frame comprises a fifth bit of the DFID value.

14. The network controller of claim 11, wherein the processor further:
    composes a media access plan (MAP) having a transmission slot for the apparatus, based at least in part on the (RRE) and the DFID value determined therefrom, and
    transmits a message comprising the (MAP) to the apparatus.

15. A method of transmitting PQoS DFID information in a MoCA network without increasing a size of a standard-defined MoCA reservation request frame format, the method comprising:
    assigning one or more values in a first set of one or more fields of a MoCA reservation request element, the first set adapted to indicate a unicast PQoS flow with a DFID value;
    assigning one or more values in a second set of one or more fields of the MoCA reservation request element, the second set adapted to represent the DFID value; and
    causing transmission of a message comprising the MoCA reservation request element to a network coordinator.

16. A method of receiving PQoS DFID information in a MoCA network, the method comprising:
    receiving a message comprising a MoCA reservation request element (RRE);
    determining whether a FRAME_SUBTYPE field in the RRE indicates a unicast PQoS flow with a DFID value; and
    if a unicast PQoS flow with a DFID value is indicated, determining the DFID value from HIGH_BIT and FRAME_TYPE fields of the RRE.

17. An apparatus in a MoCA network, comprising:
    means for assigning one or more values in a first set of one or more fields of a MoCA reservation request element without increasing a size of a standard-defined MoCA reservation request frame format, the first set adapted to indicate a unicast PQoS flow with a DFID value;
    means for assigning one or more values in a second set of one or more fields of the MoCA reservation request element without increasing a size of the standard-defined MoCA reservation request frame format, the second set adapted to represent the DFID value; and means for causing transmission of a message comprising the MoCA reservation request element to a network coordinator.

18. A network controller in a MoCA network, comprising:
means for receiving a message comprising a MoCA reservation request element (RRE);
means for determining whether a FRAME_SUBTYPE field in the RRE indicates a unicast PQoS flow with a DFID value; and
means for determining the DFID value from HIGH_BIT and FRAME_TYPE fields of the RRE, if a unicast PQoS flow with a DFID value is indicated.

19. A non-transitory computer readable medium comprising computer executable instructions that, upon execution thereof, cause a processor in an apparatus in a MoCA network to perform the steps of:
assigning one or more values in a first set of one or more fields of a standard-defined MoCA reservation request element without increasing a size of the MoCA reservation request frame format, the first set adapted to indicate a unicast PQoS flow with a DFID value;
assigning one or more values in a second set of one or more fields of the MoCA reservation request element without increasing a size of the MoCA reservation request frame format, the second set adapted to represent the DFID value; and
causing transmission of a message comprising the MoCA reservation request element to a network coordinator.

* * * * *